United States Patent
Oura (10) Patent No.: US 7,292,609 B2
(45) Date of Patent: Nov. 6, 2007

(54) METHOD AND APPARATUS FOR CDMA SIGNAL RECEPTION

(75) Inventor: Satoshi Oura, Tokyo (JP)

(73) Assignee: NEC Corporation, Tokyo (JP)

(*) Notice: Subject to any disclaimer, the term of this patent is extended or adjusted under 35 U.S.C. 154(b) by 421 days.

(21) Appl. No.: 10/961,290

(22) Filed: Oct. 8, 2004

(65) Prior Publication Data

US 2005/0078639 A1    Apr. 14, 2005

(30) Foreign Application Priority Data

Oct. 8, 2003    (JP)    ............................. 2003-349347

(51) Int. Cl.
 H04J 3/06    (2006.01)
(52) U.S. Cl. ...................... 370/519; 370/521; 370/335; 370/342; 375/144; 375/148; 375/229; 375/347; 455/506; 455/504; 455/65
(58) Field of Classification Search ................ 370/335, 370/342, 479, 336, 147, 519, 512, 208, 320, 370/210, 343, 490, 521, 142, 345, 252, 324, 370/347, 503, 350, 508, 509, 510; 455/65, 455/504, 132–135, 550.1, 575.1, 424, 425, 455/561, 562.1, 456.5, 456.6, 452.1, 450, 455/455, 506, 501, 502, 509, 515, 63.1, 67.11, 455/67.13, 296, 283, 295, 114.2, 143, 303; 375/140–150, 316, 343, 349, 347, 340, 130, 375/346, 229, 230, 232, 152, 260, 267
See application file for complete search history.

(56) References Cited

U.S. PATENT DOCUMENTS 5,805,648 A * 9/1998 Sutton ........................ 375/367

| 6,356,542 | B1 * | 3/2002 | Hayata ........................ 370/342 |
| 6,650,692 | B2 * | 11/2003 | Inoue et al. ................. 375/147 |
| 6,728,324 | B1 * | 4/2004 | Shan et al. .................. 375/346 |
| 6,765,894 | B1 * | 7/2004 | Hayashi ...................... 370/335 |
| 6,934,553 | B2 * | 8/2005 | Kuroiwa et al. ............ 455/500 |
| 7,050,482 | B2 * | 5/2006 | Imai et al. .................. 375/145 |

(Continued)

FOREIGN PATENT DOCUMENTS

EP    1 143 631 A2    10/2001

(Continued)

*Primary Examiner*—Edward F. Urban
*Assistant Examiner*—Charles Chow
(74) *Attorney, Agent, or Firm*—Scully, Scott, Murphy & Presser, P.C.

(57) ABSTRACT

The N peaks are selected from a delay profile in order starting from the highest peak involved in the delay profile, the path level and path timing are determined for each of the selected peaks, and the identical paths individually responsible for different delay profiles are detected by comparing the path timings calculated for the preceding time and the path timings calculated for the present time. Based of the path levels calculated for the preceding time and the path levels calculated for the present time, averaged path levels are computed on a path-by-path basis for the present time, a predetermined threshold is applied to the computed average path levels, and the paths to be allocated to the fingers are selected. Of the path timings that have been obtained for respective selected paths, the latest path timings are allocated to the fingers as synchronization timings.

14 Claims, 6 Drawing Sheets

U.S. PATENT DOCUMENTS

| | | |
|---|---|---|
| 7,054,396 B2 * | 5/2006 | Shan ........................ 375/346 |
| 7,088,956 B2 * | 8/2006 | Kishigami et al. ............ 455/65 |
| 2002/0003791 A1 | 1/2002 | Hayata |
| 2003/0123408 A1 * | 7/2003 | Saitou ........................ 370/335 |
| 2004/0037380 A1 * | 2/2004 | Shan ........................ 375/346 |
| 2004/0071193 A1 * | 4/2004 | Atarashi et al. ............ 375/144 |
| 2004/0179582 A1 * | 9/2004 | Suzuki ........................ 375/145 |
| 2004/0208234 A1 * | 10/2004 | Naka et al. .................. 375/148 |
| 2004/0223540 A1 * | 11/2004 | Shan ........................ 375/150 |
| 2004/0247044 A1 * | 12/2004 | Matsushita et al. ......... 375/316 |
| 2005/0107969 A1 * | 5/2005 | Jitsukawa et al. ............ 702/77 |

FOREIGN PATENT DOCUMENTS

| | | |
|---|---|---|
| JP | 2000-115030 | 4/2000 |
| JP | 2000-134135 | 5/2000 |
| JP | 2001-251215 | 9/2001 |
| JP | 2001-267958 | 9/2001 |
| JP | 2001-292076 | 10/2001 |
| WO | WO 01/29982 A1 | 4/2001 |

* cited by examiner

METHOD AND APPARATUS FOR CDMA SIGNAL RECEPTION

BACKGROUND OF THE INVENTION

1. Field of the Invention

The present invention relates to a signal reception method and a signal reception apparatus compliant with the CDMA (code division multiple access) communication scheme.

2. Description of the Background Arts

In a CDMA communication system, a sending end spreads transmission data over a wideband spectrum range using a predetermined individual spreading code assigned in advance, and the receiving end despreads (i.e., demodulates) the reception signal through the use of the identical spreading code. As a spreading code, a pseudo-random code sequence, for example, has been typically used, and if the synchronization in the spreading codes is not established between the sending and receiving ends, the despreading will not be properly achieved.

Generally, the radio propagation route between a sending end and a receiving end is not necessarily single, and a plurality of the propagation routes can be present due to reflection and/or diffraction of the radiowave. The receiving end receives the signals that have propagated through the plurality of the propagation routes, at different timings. The propagation route is commonly called a path. The CDMA communication system individually despreads the plurality of reception signals that have arrived through different paths and thus in different propagation times with different reception timings and then combines the despread signals, thereby achieving the diversity effect and improving the reception sensitivity and reception quality. This manner of combining the despread signals resembles gathering of several things by a rake. For this reason, the combination is called a RAKE combination. In addition, the arrangements for individually effecting the despread on a reception-signal basis are called fingers. The receiver adapted for the RAKE combination is provided with a plurality of fingers and capable of despreading the reception signals as many as up to the number of the fingers to achieve a RAKE combination.

The receiver in the CDMA communication system, i.e., the CDMA receiver, performs path search to detect the timing synchronization of the spreading codes on a path-by-path basis. A delay profiles is generated through the path search. In the path search, the correlation level at each timing between the spreading code of the receiving end and the reception signal is determined by computing the correlation between the former and latter while shifting the timing (the synchronization time) of the former in small steps. The correlation level thus calculated is called a reception level. Representing the timing shift in the abscissa and the correlation level in the ordinate over one signal-reception period makes up a delay profile. The delay profile represents the correlation power distribution of the signal of interest against a shift of timing, i.e., a delay time. In a delay profile, each of the peaks, which represent high correlation levels, corresponds to a reception path. Accordingly, by despreading the reception signal in synchronization with the timing of each peak, normal and high-level demodulation of the reception signal can be achieved. Therefore, the target of performing the path search resides in the establishment of the synchronization timing of the spreading code for each of the fingers.

A case may happen, however, that the state of propagation between a sending end and a receiving end varies from time to time or that, when at least one of the sending and receiving ends moves, for example, a new path suddenly comes out or the path of a high reception level, which has so far existed, is suddenly lost, as the moving end moves. For this reason, it is required constantly to perform the path search to update the delay profile and further to update the synchronization timing for each of the fingers. Conventionally, it has been common to establish a threshold on the correlation levels involved in a delay profile in order to allocate the paths, no more than the number of the fingers, corresponding to the peaks that have levels in excess of the threshold to the fingers and drop the paths corresponding to the peaks that have levels below the threshold from the allocation to the fingers. In this approach, the cases may happen that the values of the correlation levels in the delay profile widely change under the environment in which, for example, multipath fading occurs, causing changeovers in the synchronization timing to be allocated to a certain finger and in turn causing frequent changeovers of the reception paths. Such frequent changeovers of the reception paths significantly deteriorate the reception characteristics of the CDMA reception system. Furthermore, a delay profile obtained through a single path search sometimes includes a high level noise. It has been proposed to perform an averaging process on the delay profile over a time period sufficiently longer than the fading period and make the path allocation through the use of the averaged delay profile thereby improving the accuracy of detecting the path as well as preventing occurrence of excessive changeovers of the paths. In this case, the threshold control is effected on the averaged delay profile to select the paths to be allocated to respective fingers. The averaged delay profile described above means the delay profile generated by taking a plurality of delay profiles as objects of an average calculation and averaging the values of the correlation levels at respective timings over the plurality of the delay profiles. In other words, in an averaged delay profile, each of the correlation levels is represented by the average of the correlation levels at respective specified timings in the plurality of signal-reception periods.

Since use of the averaged delay profile, however, cannot be promptly adaptive to the cases such as where a new intense path comes out and where a path that has so far existed is lost, a case could adversely occur that the quality of the reception signals is degraded. In order to be preventive of such situations, Japanese Patent Laid-open Application No. 2001-297076 (JP, P2001-292076A) describes a multipath detection circuit provided with both the section for averaging the delay profile over a long time period and the section for averaging the delay profile over a short time period to provide a path allocation to fingers on the basis of both of the averaging results. Japanese Patent Laid-open Application No. 2001-267958 (JP, P2001-267958A) describes an arrangement for adaptively controlling the number of the delay profiles employed for averaging.

Japanese Patent Laid-open Application No. 2000-115030 (JP, P2000-115030A) describes an arrangement in which, in selecting paths based on an averaged delay profile, weights are assigned to the currently selected paths to obviate occurrence of excessively frequent changeovers of the path.

Figure 1:
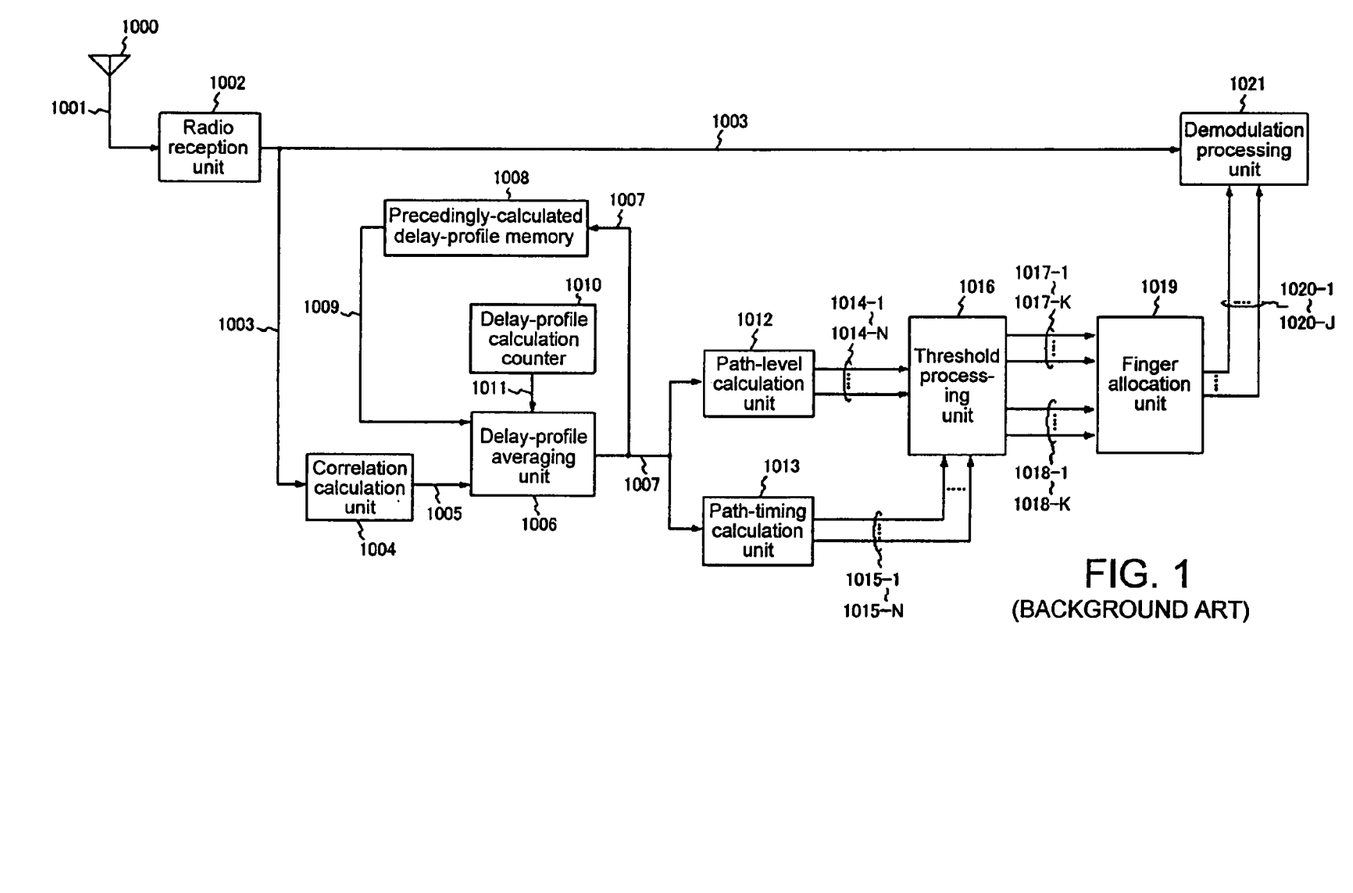
FIG. 1 is a block diagram illustrating the construction of a conventional CDMA receiver.

FIG. 1 illustrates an example of a signal-reception device configured to detect the synchronization timing using the above-described prior art.

The CDMA receiver shown in FIG. 1 comprises antenna 1000 for receiving a radio signal; radio reception unit 1002 for converting radio signal 1001 received at antenna 1000 into baseband signal 1003; correlation calculation unit 1004 for calculating the correlation value of the baseband signal 1003 with the spreading code and providing delay profile 1005; delay-profile averaging unit 1006 for averaging the precedingly calculated delay profile and the presently calculated delay profile; precedingly-calculated delay-profile memory 1008 for storing an averaged delay profile calculated at delay-profile averaging unit 1006 and supplying the averaged delay profile to delay-profile averaging unit 1006 for the next calculation; and delay-profile calculation counter 1010 for updating the average calculation number (the number of calculations of averaging the delay profile) 1011 and supplying the updated averaging calculation number to delay-profile averaging unit 1006. Correlation calculation unit 1004 calculates the delay profile using, for example, a sliding correlator and a matched filter.

The CDMA receiver, furthermore, has path-level calculation unit 1012 for calculating path levels 1014-1 to 1014-N of the respective paths based on the averaged delay profile; path-timing calculation unit 1013 for calculating path timings 1015-1 to 1015-N of the respective paths based on the averaged delay profile; threshold processing unit 1016 for deciding whether or not path levels 1014-1 to 1014-N exceed the threshold; finger allocation unit 1019 adapted to receiving the information on path levels 1017-1 to 1017-K of K paths that exceed the threshold and also path timing 1018-1 to 1018-K corresponding to the K path levels, for allocating J paths of these K paths to fingers, J being a number within a predetermined number of the fingers; and demodulation processing unit 1021 for effecting despreading and demodulation processing on a reception signal 1003 making use of path timings 1020-1 to 1020-J of the paths allocated to the fingers as synchronization timings. Demodulation processing unit 1021 is provided with a predetermined number of fingers, each of which has a path timing established as a synchronization timing and despreads (demodulates) a baseband signal using spreading code based on the synchronization timing established on the finger of interest. Demodulation processing unit 1021 further RAKE-combines the despread signals provided from the respective fingers.

In the CDMA receiver, a precedingly calculated delay profile 1009 is stored in precedingly-calculated delay-profile memory 1008, and delay profile 1005 provided from correlation calculation unit 1004 and precedingly calculated delay profile 1009 are averaged by delay-profile averaging unit 1006. Then, delay-profile calculation counter 1010 updates average calculation number 1011 and supplies the updated result to delay-profile averaging unit 1006. Averaged delay profile 1007 is distributed to path-level calculation unit 1012 and path-timing calculation unit 1013. Path-level calculation unit 1012 selects N peaks of averaged delay profile 1007 in descending order of levels, where N is a natural number, and sends the levels of the selected peaks to threshold processing unit 1016 as N path levels 1014-1 to 1014-N. Path-timing calculation unit 1013 selects N peaks of averaged delay profile 1007 in descending order of levels, and sends the timings of the selected peaks to threshold processing unit 1016 as N path timings 1015-1 to 1015-N.

Threshold processing unit 1016 decides whether or not path levels 1014-1 to 1014-N for N paths exceed the threshold, and supplies path levels 1017-1 to 1017-K and path timing 1018-1 to 1018-K of the K paths that have path levels in excess of the threshold to finger allocation unit 1019. Finger allocation unit 1019 allocates to the fingers J paths selected out of K paths in descending order of path levels 1017-1 to 1017-K, J being a predetermined number, and provides path timings 1020-1 to 1020-J to demodulation processing unit 1021. In this case, if K>J, then some of path timings 1018-1 to 1018-K are dropped from the allocation to the fingers. If J is smaller than the number of the fingers, then there can be at least one finger to which a path is not allocated at this time point by finger allocation unit 1019.

Demodulation processing unit 1021 performs the demodulation processing such as the RAKE combination of the reception signals 1003 using path timings 1020-1 to 1020-J as synchronization timings and delivers the demodulation result. Before notified of the path timings from finger allocation unit 1019, demodulation processing unit 1021 holds the path timings notified for the last time and performs the demodulation processing using the holding path timings as synchronization timings. Thus, when the average processing of the delay profile is being implemented, demodulation processing unit 1021 performs the demodulation using the path timings calculated from the last averaged delay profile.

In the conventional CDMA receiver, since the path detection is performed on the basis of an averaged delay profile as described above, it has been possible to improve an S/N ratio and also to attain an improvement in an accuracy of the path detection through smoothing a noise level. However, since the path timing cannot be updated during the process of averaging the delay profile, it has been impossible to follow the timing variations, which have caused deterioration of the characteristics. This is because the averaging is effected not only with respect to the path levels but also with respect to time. Explanation is next given regarding the problem caused by the averaging made with respect to time.

Let a certain path (a propagation route) be focused on. Then, particularly if at least one of the sending end and receiving end moves, the movement will cause the path timing to change little by little. Consequently, the path timings involved in the latest delay profile of a plurality of delay profiles that have been subjected to averaging process will nearest approximate the current optimum path timings. The path timings involved in the averaged delay profile are under the influence of the path timings involved in delay profiles other than the latest delay profile, and it is presumed that the path timings derived from the averaged delay profile could deviate from the present optimum path timings.

In the CDMA communication system, the unit representative of the time length corresponding to the time duration for one bit of the spreading code is called "chip" and even only one chip of the time deviation in the synchronization timing causes failure in a normal despread. For example, only 0.7 chips of out-of-synchronization causes a significant deterioration in the reception characteristics (e.g., the reception sensitivity, the S/N ratio). It is not necessarily an optimum approach from the view of exact accordance of the synchronization timings to extract the path timings from the averaged delay profile.

Figure 2A:
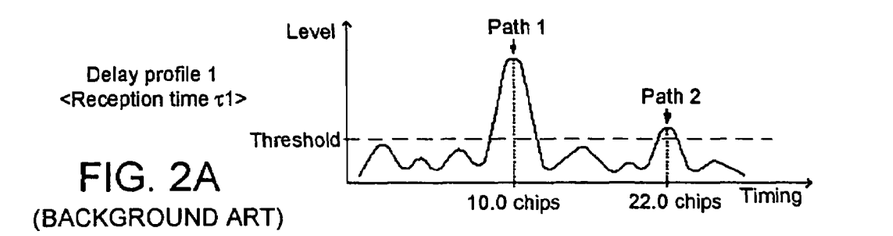
FIGS. 2A to FIG. 2D are diagrams illustrating an average of delay profiles.
Figure 2B:
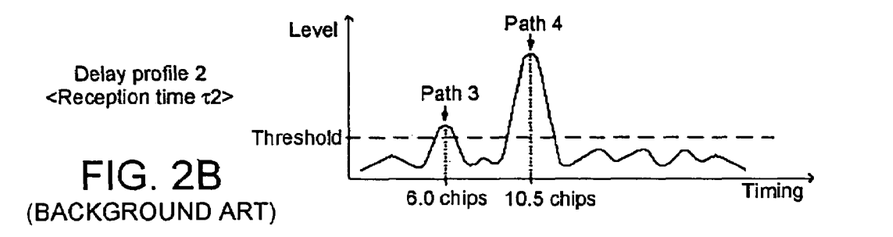
Figure 2C:
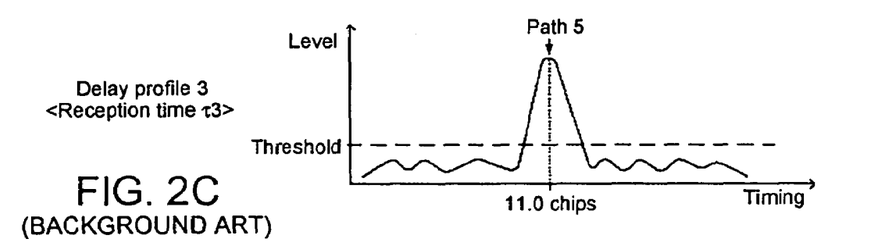

FIGS. 2A to 2D exemplify the above-described matter, illustrating an add-and-average process of a power delay profile. While a delay profile is produced every signal-reception period (for example, 10 milliseconds), the time that is selected from and representative of the time period corresponding to the delay profile of interest is called a reception time in the present example. In the illustrated figures, path 1 at the timing of 10.0 chips and path 2 at the timing of 22.0 chips are detected from delay profile 1 at reception time $\tau 1$, as is shown in FIG. 2A; path 3 at the timing of 6.0 chips and path 4 at the timing of 10.5 chips are detected from delay profile 2 at reception time $\tau 2$, as is shown in FIG. 2B; and path 5 at the timing of 11.0 chips is detected from delay profile 3 at reception time $\tau 3$, as is shown in FIG. 2C.

Figure 2D:
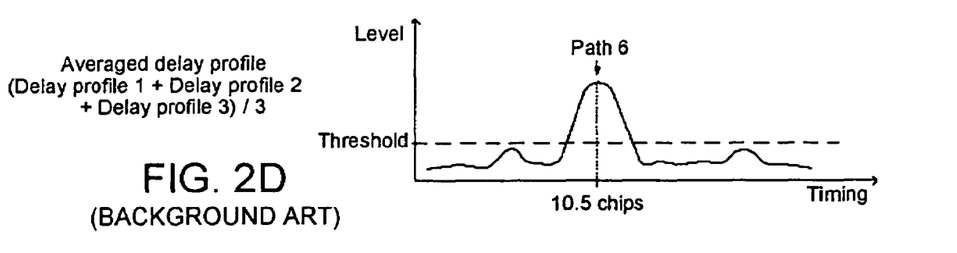

In this example, if the paths originated from the primary reception signal are path 1, path 4 and path 5, then path 2 and path 3 are decided to be erroneous detections of noises as paths. Furthermore, it is known that the path created by the reception signal varies in the timing from 10.0 chips to 11.0 chips while the reception time elapses from τ1 to τ3. Making an add-and-average calculation of delay profiles 1, 2 and 3 yields an averaged delay profile as shown in FIG. 2D, in which path 6 is detected at the timing of 10.5 chips as a result of combination of path 1, path 4 and path 5 of the reception signal and the levels of path 2 and path 3 are smoothed and lowered below the threshold so as not to be detected. Thus, add-and-averaging of delay profiles improves the detection accuracy of the path by the advantage of smoothing noise levels.

In this example, it would be optimal to employ 11 chips as a synchronization timing for despreading the reception signal to demodulate it, because the timing of the path of the reception signal involved in the latest delay profile exhibits 11.0 chips. However, the timing of 10.5 chips is detected from the averaged delay profiles. As a result, effecting the despread through the use of the timing of 10.5 chips causes degradation of the reception characteristics such as a deterioration of the reception sensitivity. Thus, sole averaging of delay profiles involves also averaging with respect of the path timing, thereby deteriorating the follow-up characteristics to the variations of timings.

In addition, as an example of a circuit that is capable of executing a threshold process, the circuits adapted to effect the threshold processes on the averaged delay profiles to determine the paths to be allocated to fingers are described in Japanese Patent Laid-open Applications No. 2000-134215 (JP, P2000-134125A) and No. 2001-251215 (JP, P2001-251215A).

As described above, the conventional CDMA receivers are problematic in that effecting the path detection on the basis of an averaged delay profile makes it impossible to follow up the variation of the path timing causing the deterioration of the characteristics, while improving the accuracy of detecting the paths.

SUMMARY OF THE INVENTION

It is an object of the present invention to provide a CDMA reception method capable of obviating deterioration of the reception characteristics caused by a variation of timing while enhancing a detection accuracy of the paths.

It is another object of the present invention to provide a CDMA reception device capable of obviating a deterioration of the reception characteristics caused by a variation of timing while enhancing a detection accuracy of the paths.

Although the CDMA reception method of the present invention is similar to the conventional CDMA reception method in that on the basis of an averaged delay profile, paths are detected and then the paths to be allocated to fingers are determined, the CDMA reception method of the present invention differs from the conventional CDMA reception method in that the path timings on the latest delay profile are established on the respective fingers as the synchronization timings corresponding to the paths.

The CDMA signal reception method according to the present invention comprises the steps of creating delay profiles at predetermined processing periods, selecting a predetermined number of peaks from the delay profiles, determining a path level and a path timing of a peak for every selected peak, comparing the path timings to detect the identical paths involved in delay profiles created in different periods of the predetermined processing periods, associating the respective peaks involved in each of the delay profiles with the paths, averaging the path levels on a path-by-path basis (referred to as path-by-path averaging) over different periods of the predetermined processing periods, selecting paths to be allocated to fingers on the basis of the averaged path levels, and allocating the latest path timings of the path timings that have been determined for the respective selected paths to the fingers as synchronization timings.

The CDMA signal reception device according to the present invention, comprises: a correlation calculation unit adapted to creating a delay profile, a path-timing calculation unit adapted to selecting a predetermined number of peaks in order starting from the highest peak involved in the delay profile and obtaining the path timings of the selected peaks, based on the delay profile, a path-level calculation unit adapted to selecting the predetermined number of peaks in order starting from the highest peak involved in the delay profile and obtaining the path levels of the selected peaks, based on the delay profile, a path-timing comparison unit adapted to comparing the path timings calculated from the delay profiles obtained in the past period with the path timings obtained in the present period, detecting the identical paths responsible for different delay profiles and associating respective peaks in each delay profile with paths, a path-level averaging unit adapted to averaging the path levels obtained by the path level calculation unit on a path-by-path basis over different delay profiles, a threshold processing unit adapted to applying a threshold to the averaged path levels and selecting the paths to be allocated to fingers, and a finger allocation unit adapted to allocating path timings to the fingers as synchronization signals, the path timings being the latest path timings of the path timings that have been obtained for respective selected paths.

In the present invention, when selecting a predetermined number of peaks from the delay profile, it is preferred to select a predetermined number of peaks in descending order of levels starting from the highest peak. In the present invention, the predetermined processing period is typically a signal-reception period. The processing period can alternatively be a predetermined period equal to, for example, an integral multiple of the signal-reception period. While the signal-reception period described herein typically refers to a radio frame unit, i.e., the period of a radio frame, a slot unit, or an integral multiple of a radio frame or an integral multiple of a slot can alternatively be used.

In the present invention, the process for averaging the path levels includes, for example, the method of computing averages making use of a forgetting factor on the basis of, for example, the average path levels calculated in the preceding time and the path levels obtained in the present time, the method of establishing a moving-average period and using the moving averages over the moving-average period, and the method of computing averages over every averaging period, where the averaging period is set to be as long as a plurality of processing periods for creating delay profiles.

As a method of detecting the identical paths, there is a method in which the peaks on different delay profiles, which come out within a predetermined timing difference (for example, 0.5 chips) from each other or one another, are deemed as peaks associated with an identical path.

In the present invention, isolating the averaging process of the path levels from the update of the path timing enables updating the path timings at, for example, every reception period of radio signals while enhancing the accuracy of detecting the paths. As a result, the present invention offers an advantage of allowing satisfactory follow-up to the timing variation while maintaining a high accuracy of detecting the paths thereby obviating deterioration of the signal-reception characteristics caused by the timing variation. In other words, since the CDMA signal-reception method and the CDMA signal-reception device according to the present invention, when performing the detection of the synchronization timing, calculate path timings at periods of receiving radio signals to update the allocation to fingers at the periods of receiving radio signals, and also calculate, at the periods of receiving the signals, path levels to compute averages of the calculated path levels and the path levels calculated in the past to realize an accurate detection of the paths, it is feasible to maintain the follow-up characteristics to the timing variation while enhancing the accuracy of detecting the paths.

Consideration is now made with an example of signal-reception path timings as shown in Table 1, which shows the case of averaging delay profiles over every three signal-reception periods and, on the basis of the averaged delay profile, determining the paths to be allocated to fingers for the subsequent three signal-reception periods. The table illustrates that the path timing is updated only once every three signal-reception periods in the prior art while the CDMA reception device according to the present invention updates the path timing every signal-reception period thereby enabling improved follow-up to the timing variation. Consequently, it is enabled to prevent the deterioration of the signal-reception characteristics caused by the timing variation properly as compared to the conventional techniques of implementing a add-and-average process of delay profiles, as illustrated in FIGS. 2A to 2D.

TABLE 1

| | Reception time | | | | | |
|---|---|---|---|---|---|---|
| | 1 | 2 | 3 | 4 | 5 | 6 |
| Path timing of received signal (unit: chip) | 10.0 | 10.5 | 11.0 | 11.5 | 12.0 | 12.5 |
| Calculated path timing by prior art (averaging period = 3 signal-reception periods) (unit: chip) | — | — | 10.5 | — | — | 12.0 |
| Calculated path timing by present invention (unit: chip) | 10.0 | 10.5 | 11.0 | 11.5 | 12.0 | 12.5 |

DETAILED DESCRIPTION OF THE PREFERRED EMBODIMENTS

Figure 3:
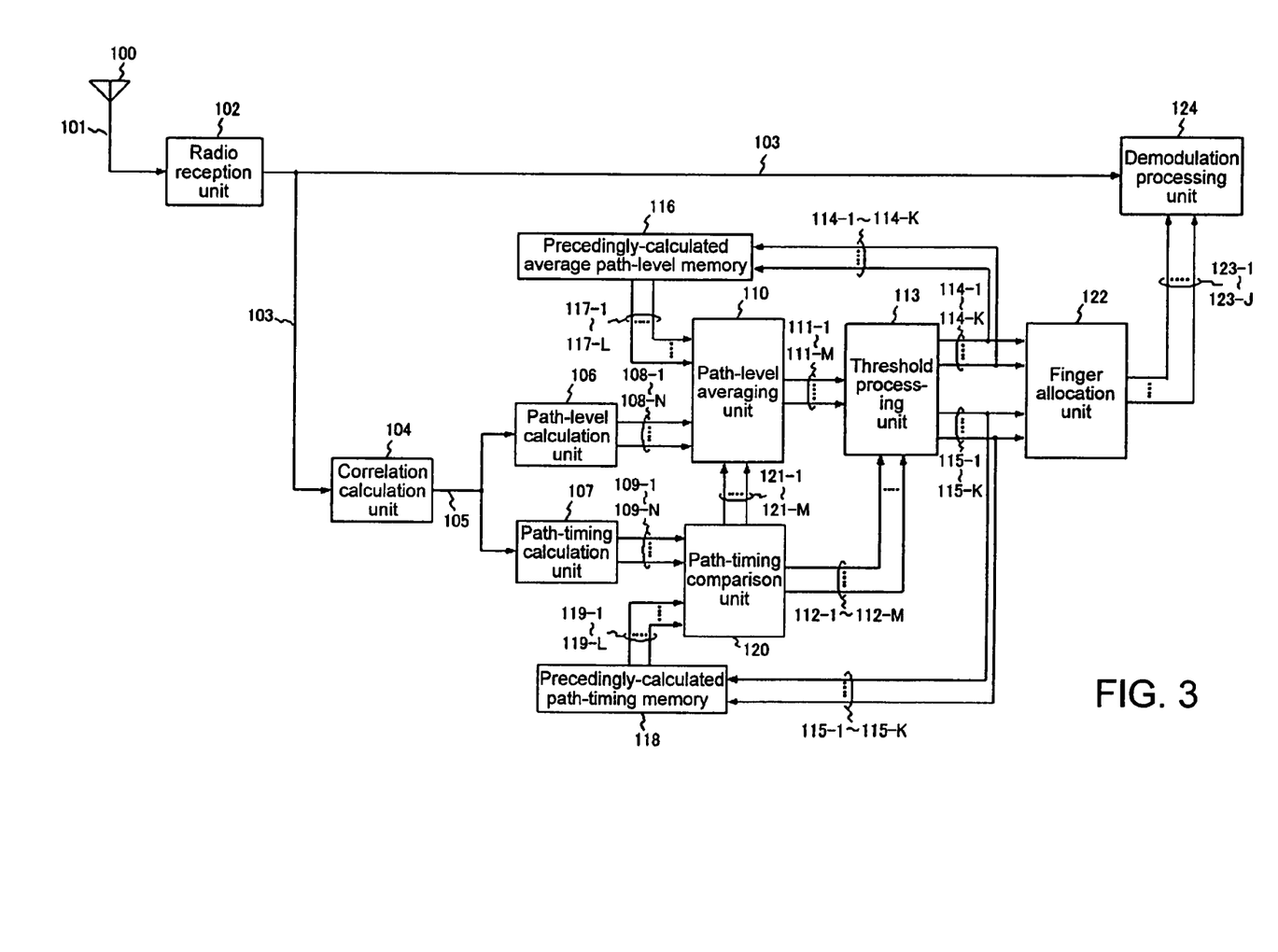
FIG. 3 is a block diagram illustrating the CDMA reception device according to a first embodiment of the present invention.

The CDMA reception device according to the first embodiment of the present invention illustrated in FIG. 3 is, in order to separately execute the averaging process of path levels and the update of path timings, provided with: antenna 100 for receiving a radio signal transmitted from a sending end; radio reception unit 102 for converting a received radio signal into a baseband signal 103; correlation calculation unit 104 for calculating the correlation value of the baseband signal 103 and providing a delay profile 105; path-level calculation unit 106 for calculating N path levels 108-1 to 108-N on the basis of delay profile 105 provided from correlation calculation unit 104; and path-timing calculation unit 107 for calculating N path timings 109-1 to 109-N on the basis of delay profile 105. The number N is a natural number. A correlation calculation unit provided with a sliding correlator and a matched filter can be employed as correlation calculation unit 104 as with the conventional CDMA reception device.

In the above device, while the path levels and the path timings are separately calculated, it is required to make clear what paths the calculated path levels and path timings are associated with. For this end, numbers are assigned to the peaks in the delay profile, for example, in descending order starting from the peak of the highest path level and the numbers are used as indices common to both the path levels and the path timings. Specifically, the path level and the path timing calculated from the highest peak are designated as path level 108-1 and path timing 109-1, respectively, the path level and the path timing calculated from the second highest peak are designated as path level 108-2 and path timing 109-2, respectively, and so forth.

Furthermore, the CDMA reception device is provided with: precedingly-calculated path-timing memory 118 for storing the precedingly calculated path timing, which is calculated for the preceding time, or calculated in the processing period; path-timing comparison unit 120 for comparing N path timings 109-1 to 109-N calculated for the present time (i.e., calculated in the present period) and L path timings 119-1 to 119-L calculated for the preceding time and finding a correspondence relation between the paths involved in the preceding delay profile and the paths involved in the present delay profile; precedingly-calculated average path-level memory 116 for storing average path levels calculated for the preceding time; path-level averaging unit 110 for averaging the path levels 108-1 to 108-N calculated for the present time and the path levels 117-1 to 117-L calculated for the preceding time on a path-by-path basis with regard to the paths decided to be identical paths by path-timing comparison unit 120; threshold processing unit 113 for deciding whether or not each of the M average path levels 111-1 to 111-M calculated for the present time by path-level averaging unit 110 exceeds a predetermined threshold; finger allocation unit 122 for allocating to fingers the paths that have the average path levels in excess of the threshold; and demodulation processing unit 124 for performing despreading process.

As threshold processing unit 113, a conventional circuit can be employed as is in which the threshold is applied to the averaged delay profile to determine the paths to be allocated to fingers. The circuit described in, for example, JP, P2000-134135A or JP, P2001-251215A can be employed.

Demodulation processing unit 124 is provided with a plurality of fingers, and despreads the baseband signal 103 by these fingers and also performs the RAKE combination to supply the demodulation result. Demodulation processing unit 124 is supplied with synchronization timings 123-1 to 123-J for respective fingers from finger allocation unit 122, where J is a natural number equal to or smaller than the number of fingers in demodulation processing unit 124.

Concerning the method of averaging the path levels at path-level averaging unit 110, while explanation is given with regard to the averaging process making use of the forgetting factor in the present embodiment, any other averaging process can be used.

Next, the details of the construction of the CDMA reception device will be described.

Like the conventional CDMA reception device, correlation calculation unit 104 provides outputs of delay profiles 105 at signal-reception periods. With each output of delay profile 105, path-level calculation unit 106 and path-timing calculation unit 107 supply path levels 108-1 to 108-N and path timings 109-1 to 109-N, respectively, associated with N peaks selected in descending order of the levels involved in delay profile 105 of interest. As described above, assigning the numbers in descending order of the path levels makes clear the correspondence relations of both path levels and path timings to respective paths. The number N above corresponds to the number of paths calculated from the delay profile of currently received signal before the delay profile is subject to the threshold process at threshold processing unit 113, and generally depends on the hardware of the computing circuit. It may be possible, however, to establish a preliminary threshold, for example, and determine N to be equal to the number of the peaks that have levels in excess of the preliminary threshold and moreover to be within the upper limit determined by the constraints of the hardware and the like.

Path-timing comparison unit 120 compares N path timings 109-1 to 109-N associated with the present delay profile and L path timings 109-1 to 109-L that were calculated for the preceding time and correspond to the path levels having been subjected to the threshold processing, and decides whether or not the path timings of the compared path timings are associated with identical paths. Eliminating repeated recognition of an identical path, path-timing comparison unit 120 recognizes M paths and, in connection to the M paths, provides an output of M path states 121-1 to 121-M and also M path timing 112-1 to 112-M. With regard to the path state, explanation will be given later. The M path states 121-1 to 121-M are supplied to path-level averaging unit 110, whereby path-level averaging unit 110 as well provides average path levels 111-1 to 111 -M corresponding to the M paths, respectively. Details of path-timing comparison unit 120 applicable to the present embodiment are described, for example, in JP, P2001-251215A.

The decision whether or not the path timings of interest are associated with respective identical paths can be attained by the method of, for example, deeming the path timings of interest as associated with an identical path if the difference between the path timing calculated for the present time and that calculated for the preceding time is within a reference value. For example, ±0.5 chips can be used as the reference value.

In this case, M is calculated according to the following equation:

$$M=(\text{number of identical paths})+\{N-(\text{number of identical paths})\}+\{L-(\text{number of identical paths})\}, \quad (1)$$

the maximum of M being N+L. For example, in the case of the calculated path timings as shown in Table 2, let the paths deem as an identical path if the difference of the path timings of the paths of concern is equal to or less than 0.5 chips. In this case, L=3, M=4; the path number 1 calculated for the preceding time and the path number 1 calculated for the present time are deemed as being associated with an identical path; and the path number 2 calculated for the preceding time and the path number 4 calculated for the present time are deemed as being associated with an identical path. Thus, the number of the identical paths is 2.

It follows that M can be calculated as $$M=2+(4-2)+(3-2)=5 \quad (2)$$

TABLE 2

| | Number of path | | | |
|---|---|---|---|---|
| | 1 | 2 | 3 | 4 |
| Path timing calculated for the preceding time (unit: chip) | 6.0 | 12.0 | 22.0 | — |
| Path timing calculated for the present time (unit: chip) | 6.5 | 16.0 | 2.0 | 12.0 |

Threshold processing unit 113 supplies K average path levels 114-1 to 114-K and K path timings 115-1 to 115-K associated with the K paths that have average path levels in excess of a predetermined threshold, included in the above described M paths. Precedingly-calculated average path-level memory 116 provides L precedingly calculated average path levels 117-1 to 117-L and precedingly-calculated path-timing memory 118 provides L precedingly calculated path timing 119-1 to 119-L. Finger allocation unit 122 provides J synchronization timings 123-1 to 123-J.

Eventually, this CDMA reception device is configured such that: N path timings 109-1 to 109-N of a reception signal are calculated at path-timing calculation unit 107; the N path timings are compared with precedingly calculated L path timings 119-1 to 119-L at path-timing comparison unit 120 to decide M path states 121-1 to 121-M; the decision result is notified to path-level averaging unit 110, and M path timings 112-1 to 112-M are notified to threshold processing unit 113.

The N path levels 108-1 to 108-N of a reception signal, on the other hand, are calculated at path-level calculation unit 106 and are subjected to average processing (path-by-path averaging processing) to average the N path levels above and L path levels 117-1 to 117-L calculated for the preceding time in accordance with the path state at path-level averaging unit 110. Threshold processing unit 113 decides whether or not average path levels 111-1 to 111-M exceed the threshold; distributes path levels 114-1 to 114-K of the paths that have the average path levels in excess of the threshold to finger allocation unit 122 and also to precedingly-calculated average path-level memory 116; distributes path timings 115-1 to 115-K to finger allocation unit 122 and also to precedingly-calculated path-timing memory 118. Of course, M is equal to or more than K. For reference, since K is definitely a number of paths calculated for the present time and having been subjected to the threshold process and L is definitely a number of paths calculated for the preceding time and having been subjected to the threshold process, K and L are in some cases coincident and in other cases do not coincident. Thus, a case may be present in which the number of paths in the outputs of both precedingly-calculated average path-level memory 116 and precedingly-calculated path-timing memory 118 coincides or does not coincide with the number of paths in the inputs of both memories.

Further, finger allocation unit 122 selects J average path timings out of K path timings 115-1 to 115-K in the order corresponding to the descending order of average path levels 114-1 to 114-K and notifies the selected path timings 123-1 to 123-J to demodulation processing unit 124 as synchronization timings. The value of J does not exceed the number of the fingers in demodulation processing unit 124, and if K is larger than the number of the fingers, then the value of J is set to the number of the fingers. On the other hand, if the value of K is smaller than the number of the fingers, then equation K=J is presumed. In this case, a finger associated with no path and notified of no synchronization timing can be present for the present time. Such a finger behaves as an invalid path and is not used for the demodulation process such as the RAKE combination.

As described above, the CDMA reception device allows updating the path timings as well as averaging the path levels of reception signals at signal-reception periods, thereby improving the accuracy of detecting the paths while maintaining the follow-up characteristics to the timing variation.

Explanation next regards the operation of the CDMA reception device illustrated in FIG. 3.

Radio signal 101 received at antenna 100 is converted to baseband signal 103 by radio reception unit 102. Baseband signal 103 is distributed to demodulation processing unit 124 and correlation calculation unit 104. Correlation calculation unit 104 computes the correlation of baseband signal 103 with the spreading code to produce delay profile 105. Delay profile 105 is distributed to path-level calculation unit 106 and path-timing calculation unit 107. Path-level calculation unit 106 selects N peaks in descending order of the levels of the peaks on delay profile 105 and supplies the N peak levels as path levels 108-1 to 108-N to path-level averaging unit 110. Path-timing calculation unit 107 selects N peaks in descending order of the levels of the peaks on delay profile 105 and calculates the timings of the N peaks and provides the calculated timings to path-timing comparison unit 120 as path timings 109-1 to 109-N. As described above, since the peaks are selected in order starting from the highest peak, the path numbers are assigned in the order of the selection. In other words, the path of path number n refers to the path corresponding to the peak that has had the $n^{th}$ highest level with the peak level of 108-n and the peak timing 109-n.

Path-timing comparison unit 120 compares path timings 109-1 to 109-N calculated for the present time with path timings 119-1 to 119-L calculated for the preceding time and having been subjected to the threshold process, and if the compared timings are associated with the identical paths, then the identical paths are deemed as existing paths and if otherwise, then the paths associated with the compared timings are deemed as newly emergent paths. When path timings 119-1 to 119-L calculated for the preceding time and having been subjected to the threshold process are compared with path timings 109-1 to 109-N calculated for the present time, if there are path timings not associated with identical paths, then the paths associated with the precedingly calculated and threshold-processed path timings are deemed as lost paths. For example, in the calculated path timings as shown in Table 2, if it is presumed that the peaks of different delay profiles having a timing difference equal to or less than 0.5 chips from each other or one another are deemed as associated with an identical path, then path numbers 1 and 2 of the precedingly calculated paths are existing paths and path number 3 is a lost path; and path numbers 1 and 4 of the currently calculated paths are existing paths and path numbers 2 and 3 are the newly emergent paths.

Path-timing comparison unit 120 merges the N paths calculated for the present time and the L paths calculated for the preceding time, allowing for the number of the identical paths; provides path states 121-1 to 121-M, which are represented in terms of "existing", "newly emergent" and "lost", to path-level averaging unit 110 and also provides path timings 112-1 to 112-M of the M paths to threshold processing unit 113. The number M is represented by equation (1) above, wherein {L−(number of identical paths)} represents the number of the lost paths, the path timings calculated for the preceding time are provided for the lost paths. The number {N−(number of identical paths)} represents the number of newly emergent paths, and the path timings calculated for the present time are provided for the newly emergent paths. Concerning the identical paths, while the case can be occurred in which the path timings calculated for the preceding time and the path timings calculated for the present time differ, it is assumed that the path timings calculated for the present time are throughout supplied. In the example shown in Table 2, while path number 1 calculated for the preceding time and path number 1 calculated for the present time represent an identical path but differing path timings, the path timing of 6.5 chips calculated for the present time is supplied as a path timing of the identical path in the subject case.

Path-level averaging unit 110 implements an averaging process of averaging, on a path-by-path basis, the path levels 108-1 to 108-N calculated for the present time and average path levels 117-1 to 117-L calculated for the preceding time in accordance with path states 121-1 to 121-M received from path-timing comparison unit 120. One of the methods of averaging includes, for example, multiplication of a forgetting factor, the averaging being effected for existing paths as follows:

average path level for the present time=λ×(average path level for the preceding time)+(1−λ)×(path level calculated for the present time)     (3)

In the above expression, λ is a number larger than 0 and smaller than 1 representing a forgetting factor to be set to, for example, λ=0.3. A large value of λ yields emphasis on the average up to the preceding time and a small value of λ yields emphasis on the delay profile calculated for the present time. While the value of λ should be properly selected. λ<0.5 is commonly preferred to put emphasis on the delay profile for the present time. The lost path is evaluated by representing the path level to be calculated for the present time as 0, and the newly emergent path is evaluated by representing the path level calculated for the preceding time as 0. For reference, while both cases, in which individual forgetting factors are used and alternatively a common forgetting factor is used for these paths, are present for each of the existing path, the lost path and newly emergent path, either of the cases can be applicable. Path-level averaging unit 110 supplies average path levels 111-1 to 111-M for M path levels to threshold processing unit 113.

Threshold processing unit 113 decides that any of average path levels 111-1 to 111-M associated with the M paths exceed a predetermined threshold, and if K average path levels 114-1 to 114-K, which are associated with K paths, exceed the threshold, then provides average path levels 114-1 to 114K and path timings 115-1 to 115-K associated with the K paths to finger allocation unit 122. As a value of the threshold and a method of establishing the threshold, the value and method known in the art can be used. Further, threshold processing unit 113 distributes average path levels 114-1 to 114-K to precedingly-calculated average path-level memory 116 to store therein to execute the averaging process of the path levels for the next time, and also distributes path timings 115-1 to 115-K to precedingly-calculated path-timing memory 118 to store therein to execute the comparison process of the path timings for the next time.

Finger allocation unit 122 selects J paths from the K paths in descending order of average path levels 114-1 to 114-K, J being the set number of the fingers, and supplies path timings 123-1 to 123-J of the selected J paths, selected from path timings 115-1 to 115-K, to demodulation processing unit 124. It is to be noted that, while finger allocation unit 122 selects the paths on the basis of the average path level, the path timings that are supplied to demodulation processing unit 124 as synchronization timings are not average path timings but the path timings provided to threshold processing unit 113 from path timing calculation unit 107 by way of path-timing comparison unit 120, i.e., the path timings involved in the latest delay profile. With regard to the lost path, however, the path timing involved in a delay profile calculated for the preceding time is provided to demodulation processing unit 124. Demodulation processing unit 124 performs the demodulation processing, such as the despreading and decoding, on the baseband signal using path timings 123-1 to 123-J as synchronization timings.

As described above, the CDMA reception device of the present embodiment allows enhancement of the path detection accuracy by making use of average path levels and also allows following-up to the variations of path timings by making use of the path timings involved in the latest delay profile as synchronization timings.

Figure 4:
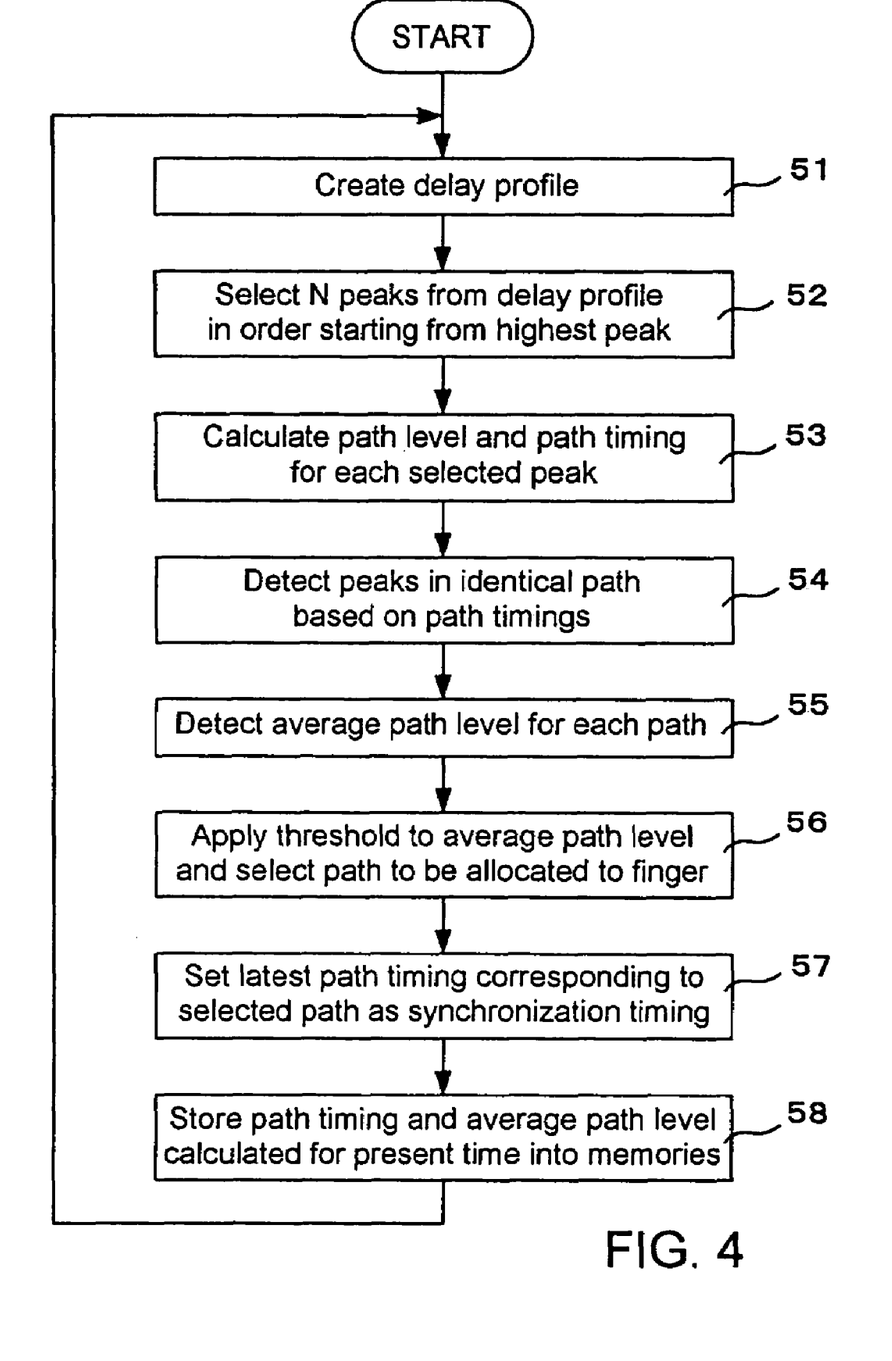
FIG. 4 is a flow chart illustrating the operation of the CDMA reception device shown in FIG. 3.

FIG. 4 is a flow chart illustrating an overview of the above described operations. In the CDMA reception method implemented by this CDMA reception device, a delay profile is produced at step 51 and N peaks are selected from the delay profile in order starting from the highest peak at step 52; and the path level and path timing are obtained for each of the selected peaks at step 53. It should be appreciated that the path levels are calculated at path-level calculation unit 106 and the path timings are calculated at path-timing calculation unit 107. Next, at step 54, the path timings calculated for the preceding time and stored in precedingly-calculated path-timing memory 118 and the path timings calculated for the present time are compared in path-timing comparison unit 120; the identical paths individually responsible for delay profiles for different reception periods are detected; and each peak involved in each delay profile is associated with the detected path. At step 55, on the other hand, average path levels for the present time are obtained for each of the paths, on the basis of the average path levels calculated for the preceding time and the path levels calculated for the present time at path-level averaging unit 110. At step 56, the paths to be allocated to fingers are selected on the basis of a predetermined threshold at threshold processing unit 113. At step 57, the latest path timings of the path timings that have been already obtained on a path-by-path basis for respective selected paths are allocated to the fingers as synchronization timings. Next, at step 58, the path timings and average path levels calculated for the present time are stored precedingly-calculated path-timing memory 118 and precedingly-calculated average path-level memory 116, respectively. The step jumps back to step 51 to repeat the same procedures as described above in the next signal-reception period.

It is to be noted that, while the reception device is used in the present embodiment in which the communication system is pursuant to the CDMA, the present invention is applicable to reception device compliant to other communication system intended for performing the demodulation process of a signal by means of a synchronization-timing detection circuit, as well.

Explanation is next presented regarding the CDMA reception device according to a second embodiment of the present invention.

Figure 5:
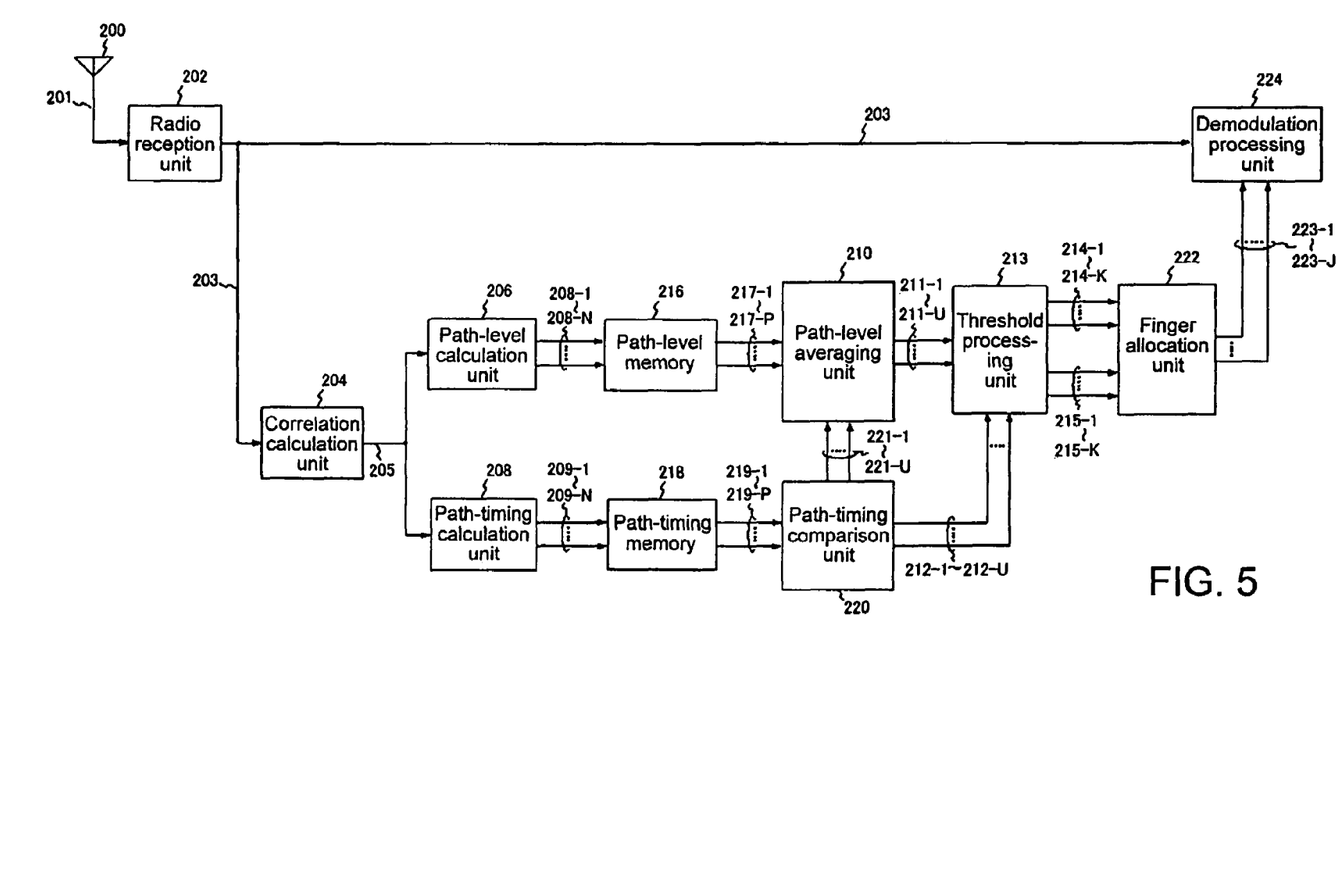
FIG. 5 is a block diagram illustrating the CDMA reception device according to the second embodiment of the present invention.

While the CDMA reception device shown in FIG. 3 effects the averaging of path levels through the use of a forgetting factor, the CDMA reception device of the second embodiment shown in FIG. 5 is useful in the case where moving averaging is applied for the averaging process of the path levels. The device shown in FIG. 5 differs in construction from device shown in FIG. 3 in that precedingly-calculated average path-level memory 116 is replaced with path-level memory 216 and precedingly-calculated path-timing memory 118 is replaced with path-timing memory 218. For reference, the meanings of path numbers N, K and J in the device shown in FIG. 5 are the same as those in the device shown in FIG. 3.

The CDMA reception device shown in FIG. 5 is provided with antenna 200 for receiving a radio signal; radio reception unit 202 for converting received radio signal 201 to baseband signal 203; correlation calculation unit 204 for calculating the correlation value of the baseband signal 203 and providing delay profile 205; path-level calculation unit 206 for calculating N path levels 208-1 to 208-N on the basis of delay profile 205 provided from correlation calculation unit 204; path-timing calculation unit 207 for calculating N path timings 209-1 to 209-N on the basis of delay profile 205; path-level memory 216 for storing path levels 208-1 to 208-N; and path-timing memory 218 for storing path timings 209-1 to 209-N.

Path-level memory 216 stores path levels 217-1 to 217-P, including path levels 208-1 to 208-N calculated for the present time, for the specified time period over which the moving average is computed. If it is prescribed that the moving average is computed over R signal-reception periods, where R>1, then path-level memory 216 keeps path-level storage regions for R-time storage operations and stores the path levels in such a manner that the latest path levels are written into the path-level storage region in which the oldest path levels have been written, to overwrite the oldest path levels through the use of a cyclic buffer or a ring buffer, or the like. It follows that P=R×N. In a similar fashion, path-timing memory 218 stores path timings 219-1 to 219-P for the time periods over which the moving average is computed, including path timings 209-1 to 209-N calculated for the present time. If the moving average is specified to compute an average over R signal-reception periods, then path-timing memory 218 keeps path-timing storage regions for R-time storage operations and stores the path timings in such a manner that the latest path timings are written into the path-timing storage region in which the oldest path timings have been written, to overwrite the oldest path timings through the use of a cyclic buffer or a ring buffer, or the like. The number of signal-reception periods corresponding to a time period of the moving average, i.e., the value of R, can properly be determined, and, for example, R=10 can be established.

In addition, the CDMA reception device is provided with: path-timing comparison unit 220 for deciding the correspondence relations between or among the paths associated with different delay profiles on the basis of path timings 219-1 to 219-P over a whole moving average period provided from path-timing memory 218; path-level averaging unit 210 for creating path-by-path averages of path levels on the basis of path levels 217-1 to 217-P over a whole moving average period provided from path-level memory 216; threshold processing unit 213 for deciding whether or not U average path levels 211-1 to 211-U, calculated for the present time at path-level averaging unit 210, exceed the threshold; finger allocation unit 222 for allocating the paths, which associate with the average path levels in excess of the threshold, to the fingers; and demodulation processing unit 224 for executing the despreading process and supplying the demodulation result. Demodulation processing unit 224 is supplied with synchronization timings 223-1 to 223-J for the individual fingers from finger allocation unit 222.

Concerning path timings 219-1 to 219-P for R signal-reception periods, if there are sets of path timings that associate individually with identical paths, then path-timing comparison unit 220 detects the identical paths for each of signal-reception periods; provides U path states 221-1 to 221-U to path-level averaging unit 210; and provides path timings 212-1 to 212-U to threshold processing unit 213, wherein the number U refers to the number of the paths allowing for the number of the identical paths, being smaller than P. The number U can be obtained as follows:

$$U = \text{(number of identical paths)} + \text{(number of paths other than identical paths)} \quad (4)$$

For example, in the calculated path timings as described in Table 3, let a case be considered in which N=4, R=3 and the paths that associate with path timings differing in timing difference by 0.5 chips or less are deemed as an identical path. In this case, a set of the path timings at signal-reception time of 1 in path number 1; at signal-reception time of 2 in path number 2; and at signal-reception time of 3 in path number 1; are associated with an identical path. A set of the path timings at signal-reception time of 1 in path number 3; and at signal-reception time of 3 in path number 2; are associated with another identical path. Consequently, since the number of the identical paths equals 2 and the number of the paths other than the identical paths equals 7, the following equation holds:

$$U = 2 + 7 = 9. \quad (5)$$

TABLE 3

|  | Number of path | | | |
|---|---|---|---|---|
|  | 1 | 2 | 3 | 4 |
| Calculated path timing at signal-reception time = 1 (Unit: chip) | 5.0 | 22.0 | 11.0 | 9.0 |
| Calculated path timing at signal-reception time = 2 (Unit: chip) | 19.0 | 4.5 | 2.0 | 25.5 |
| Calculated path timing at signal-reception time = 3 (Unit: chip) | 5.0 | 11.0 | 4.0 | 30.0 |

Path-level averaging unit 210 executes the moving averaging process of path levels 217-1 to 217-P supplied from path-level memory 216 in accordance with path states 221-1 to 221-U and supplies average path levels 211-1 to 211-U to threshold processing unit 213.

Description next regards the method of calculating the moving average of the present embodiment.

Average path level $P_{i,mavg}$ for the $i^{th}$ path at current reception time S computed in accordance to the moving average method is as follows:

$$P_{i,mavg} = \frac{1}{R} \sum_{t=S-R+1}^{S} P_i(t) \quad (6)$$

where R denotes the number of signal-reception periods over which the moving average is computed and $P_i(t)$ denotes the path level of $i^{th}$ path at the reception time t.

As described above, in the CDMA reception device shown in FIG. 5, creating moving averages of the path levels makes it possible to improve an accuracy of detecting the paths and moreover enables update of the path timings every signal-reception period even in course of the average calculation protecting the signal-reception characteristics from deterioration caused by variations of the path timings.

Figure 6:
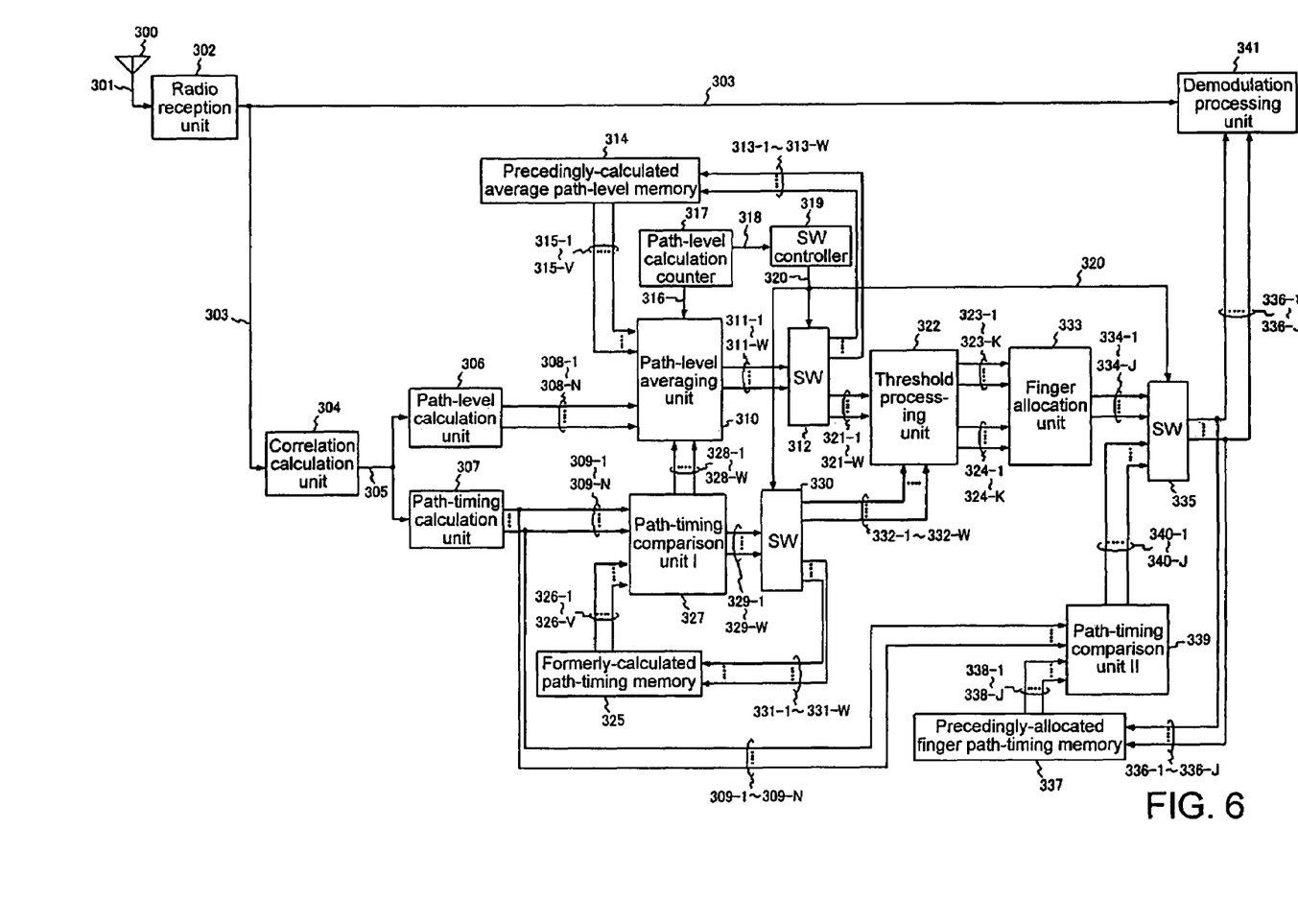
FIG. 6 is a block diagram illustrating the CDMA receiver device according to the third embodiment of the present invention.

Explanation is next presented with reference to FIG. 6 regarding the CDMA reception device of another embodiment according to the present invention. The CDMA reception device shown in FIG. 6 is useful for the case of using an interval average in the averaging process of the path levels.

The CDMA reception device shown in FIG. 6 differs from the device shown in FIG. 3 in that: precedingly-calculated path-timing memory 118 is replaced with formerly-calculated path-timing memory 325; path-timing comparison unit 120 is replaced with first path-timing comparison unit 327; and there are added path level calculation counter 317 for updating the number of averaging calculations in the averaging process of path levels; three switches 312, 330 and 335; switch controller 319 for controlling switching operations of switches 312, 330 and 335; precedingly-allocated finger path-timing memory 337 for storing path timings 336-1 to 336-J having been notified to demodulation processing unit 341 for the preceding time; and second path-timing comparison unit 339 for comparing path timings 338-1 to 338-J having been allocated to the fingers for the preceding time and path timings 309-1 to 309-N calculated for the present time. In addition, formerly-calculated path-timing memory 325 stores path timings 331-1 to 331-W supplied from first path-timing comparison unit 327. For reference, numbers of paths N, K, and J in the CDMA reception device shown in FIG. 6 are of the same definitions as those in the CDMA reception device shown in FIG. 3.

The CDMA reception device shown in FIG. 6 is provided with: antenna 300 for receiving a radio signal; radio reception unit 302 for converting received radio signal 301 to baseband signal 303; correlation calculation unit 304 for calculating the correlation value of baseband signal 303 and providing delay profile 305; path-level calculation unit 306 for calculating N path levels 308-1 to 308-N from delay profile 305 supplied from correlation calculation unit 304; path-timing calculation unit 307 for calculating N path timings 309-1 to 309-N from delay profile 305; formerly-calculated path-timing memory 325 for storing the path timings calculated in the past; first path-timing comparison unit 327 for comparing N path timings 309-1 to 309-N calculated for the present times and V path timings 326-1 to 326-V calculated in the past; precedingly-calculated average path-level memory 314 for storing average path levels calculated for the preceding time; path-level averaging unit 310 for computing path-by-path averages of path levels 308-1 to 308-N calculated for the present time and average path levels 315-1 to 315-V calculated for the preceding time; for each of the paths that are decided to be identical paths by first path-level averaging unit 327; threshold processing unit 322 for deciding whether each of W average path levels 311-1 to 311-W, which are calculated for the present time at path-level averaging unit 310, exceeds the threshold; finger allocation unit 333 for allocating the paths, which have the average path levels in excess of the threshold, to the fingers; and demodulation processing unit 341 for executing the despreading demodulation process and supplying the demodulation result.

As described above, the CDMA reception device is additionally provided with: path-level calculation counter 317 for updating the number of averaging calculations in the averaging process of path levels; three switches 312, 330 and 335; switch controller 319 for controlling switching operations of three switches 312, 330 and 335; precedingly-allocated finger path-timing memory 337 for storing path timings 336-1 to 336-J having been notified to demodulation processing unit 341 for the preceding time; and second path-timing comparison unit 339 for comparing path timings 338-1 to 338-J having been allocated to the fingers for the preceding time and path timings 309-1 to 309-N allocated to the fingers for the present time.

While path-level averaging unit 310 performs the path-by-path-average processing of path levels 308-1 to 308-N calculated for the present time and the average path levels 315-1 to 315-V calculated for the preceding time as with the device shown in FIG. 3, the interval average method is applied to the averaging process. Path-level averaging unit 310 computes average path level $P_{i,avg}$ over a discrete signal-reception period, for example, (t=0, . . . , T−1) as follows:

$$P_{i,avg} = \frac{1}{T}\sum_{t=0}^{T-1} P_i(t) \qquad (6)$$

where $P_i(t)$ denotes the path level of $i^{th}$ path at reception time t, and averaging period T is a natural number and can be set to, for example, T=10.

In this case, since the average processing is performed T times, the reception time is T−1. As a result, average path levels 311-1 to 311-W cannot be supplied from path-level averaging unit 310 before the number of averaging calculations attains T. For reference, the number of averaging calculations refers to the number incremented by 1 from 1 to the number indicative of the averaging period. Path-level calculation counter 317 updates the number of averaging calculations by adding 1 to the number of averaging calculations every signal-reception period and supplies the updated result to path-level averaging unit 310, wherein the initial value of the number of averaging calculations is 1 and when the number attains the averaging period, the next number is set to 1.

Path-level calculation counter 317 provides state-of-average-processing signal 318 to switch controller 319. State-of-average-processing signal 318 indicates the value indicating the end of the averaging process of interest when the number of averaging calculations attains the averaging period and also indicates the value indicating on-average-processing while the number of averaging calculations is smaller than averaging period. Switch controller 319 provides switch control signal 320 to turn switch 312, switch 330 and switch 335 off when state-of-average-processing signal 318 indicates on-average-processing, and provides switch control signal 320 to turn these switches on when state-of-average-processing signal 318 indicates the end of the averaging process.

Path timings 309-1 to 309-N calculated for the present time are compared with path timings 326-1 to 326-V calculated in the past at first path-timing comparison unit 327, which decides W path states, wherein the path timings calculated in the past includes all path timings calculated as many times as the number of averaging calculations until the path timing calculation for the preceding time and is supplied from formerly-calculated path-timing memory 325. Path number V equals the number of the paths calculated as many times as the number of the average calculations until the preceding time allowing for the number of the identical paths. The calculated path timings as represented in Table 4 may be considered, for example, wherein the current number of averaging calculations is 3 and if the paths each have timing differences of 0.5 chips or less from other paths, such paths are deemed as an identical path. In this case, V is calculated as follows:

$V$=(number of identical paths)+{$N$−(number of identical paths)}+{$N$−(number of identical paths)} (7)

wherein "number of identical paths" refers to the number of the paths deemed as identical paths in the mutual relation between the calculated paths when the number of averaging calculations is 1 and those when the number of averaging calculations is 2. In the subject example, N=4, and path number 1 at the number of averaging calculations of 1 and path number 1 at the number of averaging calculations of 2 are deemed as an identical path. Thus, the number of identical paths is 1.

TABLE 4

|  | Number of path | | | |
| --- | --- | --- | --- | --- |
|  | 1 | 2 | 3 | 4 |
| Calculated path timing when number of averaging calculations = 1 (unit: chip) | 9.0 | 22.0 | 12.0 | 5.5 |
| Calculated path timing when number of averaging calculations = 2 (unit: chip) | 9.5 | 16.5 | 2.0 | 25.5 |
| Calculated path timing when number of averaging calculations = 3 (unit: chip) | 10.0 | 12.0 | 4.0 | 30.0 |

Accordingly, it follows that $V$=1+(4−1)+(4−1)=7. (8)

Further, the number W is defined to be the sum of the numbers of paths calculated for the present time and calculated in the past, allowing for the number of the identical paths. In the example shown in Table 4, "the paths calculated for the present time," means the paths when the number of averaging calculations=3, and "the paths calculated in the past" means the paths when the numbers of averaging calculations=1 and 2. Since the number V of paths calculated in the past is 7, W can be obtained from the formula as follows:

$W$=(number of identical paths)+{$N$−(number of identical paths)}+{$V$−(number of identical paths)}, (9)

where the number of the identical paths refers to the number of the paths that are deemed as identical paths in the relations among the paths calculated when the numbers of averaging calculations is 1 to 3. Accordingly, a set of path number 1 when the number of averaging calculations=1, path number 1 when the number of averaging calculations=2, and path number 1 when the number of averaging calculations=3, and a set of path number 3 when the number of averaging calculations=1 and path number 2 when the number of averaging calculations=3 can respectively be deemed as identical paths. For this reason, the number of identical paths is 2. Since N=4 and V=7, it follows that $$W=2+(4-2)+(7-2)=9 \qquad (10)$$

First path-timing comparison unit 327 supplies state of paths 328-1 to 328-W decided as described above to path-level averaging unit 310. First path-timing comparison unit 327, allowing for the identical paths, merges path timings 326-1 to 326-V calculated in the past and path timings 309-1 to 309-N calculated for the present time together into W path timings 329-1 to 329-W and supplies the mergence result to switch 330. Path-level averaging unit 310 computes, on a path-by-path basis, the interval-averages of path levels 315-1 to 315-V provided from precedingly-calculated average path-level memory 314 and path levels 308-1 to 308-N calculated for the present time in accordance with state of paths 328-1 to 328-W. If the number of averaging calculations does not reach the averaging period, then path-level averaging unit 310 supplies the path levels in course of averaging, and if the number of averaging calculations attains the averaging period, then supplies the averaged path levels, to switch 312.

If switch control signal 320 indicates "off", then switch 312 supplies path levels 313-1 to 313-W in course of averaging to precedingly-calculated average path-level memory 314 to store therein In order to execute an averaging process for the next time. Alternatively, if switch control signal 320 indicates "on", then switch 312 supplies averaged path levels 321-1 to 321-W to threshold processing unit 322.

If switch control signal 320 indicates "off", then switch 330 supplies input path timings 329-1 to 329-W to formerly-calculated path-timing memory 325, and If switch control signal 320 indicates "on", then switch 330 supplies input path timings 329-1 to 329-W to threshold processing unit 322. In the occasion that formerly-calculated path-timing memory 325 is not notified of the path timings from switch 330, i.e., the occasion that the averaging process has completed for one averaging period, formerly-calculated path-timing memory 325 clears all of the stored path timings calculated in the past.

Second path-timing comparison unit 339, on the other hand, executes a path timing comparison process for updating the path timings in course of interval-average processing. Second path-timing comparison unit 339 compares path timings 338-1 to 338-J having been allocated to the fingers for the preceding time with path timings 309-1 to 309-N calculated for the present time and decides only that both of the path timings are associated with identical paths. If both these path timings are associated with identical paths and moreover the path timings of the paths calculated for the present time and the path timings of the paths having been allocated to the fingers for the preceding time differ, then second path-timing comparison unit 339 updates the path timings to the path timings calculated for the present time and supplies the updated path timings to switch 335. If both these path timings do not differ, then second path-timing comparison unit 339 supplies the path timings for the preceding time as is. In this case, new paths are not provided and the path timings that have been allocated to the fingers for the preceding time are used for the lost paths. Consequently, the number of the path timings supplied from second path-timing comparison unit 339 is constantly J.

Switch 335 supplies path timings 340-1 to 340-J received from second path-timing comparison unit 339 to demodulation processing unit 341 if switch control signal 320 indicates "off," and supplies path timings 334-1 to 334-J generated as a result of the threshold processing of the averaged path levels if switch control signal 320 indicates "on."

Since the third embodiment allows updating the path timings at signal-reception periods even when an averaging process is being implemented while enhancing an accuracy of path detection by using the interval average of the path levels, it is enabled to prevent the deterioration of the signal-reception characteristics caused by the timing variation. Particularly, in the third embodiment, since the threshold process is not necessarily performed every signal-reception period, it is feasible to reduce the calculation power required for the threshold process as compared to the first or second embodiment, thereby reducing electric power consumption and the like.

Foregoing explanation regards preferred embodiments of the present invention. In the foregoing, while a method of averaging through the use of a forgetting factor and the methods making use of the moving average and interval average are described as methods of computing an average by means of path-level averaging unit, the method of averaging the path levels to be applied to the present invention is not limited to the method described above.

What is claimed is:

1. A method of CDMA signal reception, comprising the steps of:
    creating delay profiles at predetermined processing periods;
    selecting a predetermined number of peaks from said delay profiles;
    determining a path level and a path timing of a peak for every selected peak;
    comparing the path timings to detect identical paths involved in delay profiles created in different periods of said predetermined processing periods;
    associating the respective peaks involved in each of said delay profiles with said paths;
    averaging said path levels on a path-by-path basis over different periods of said predetermined processing periods;
    selecting paths to be allocated to fingers on the basis of the averaged path levels; and
    allocating the latest path timings of the path timings that have been determined for the respective selected paths to the fingers as synchronization timings.

2. The method according to claim 1, wherein the averaging step comprises a step of computing averaged path levels to be obtained in a present period by adding the path levels obtained in the present period multiplied by $(1-\lambda)$ to the average path levels obtained in a preceding period multiplied by $\lambda$, presuming that $0<\lambda<1$.

3. The method according to claim 1, wherein the averaging step comprises a step of computing moving averages of said path levels over two or more periods of said predetermined processing periods.

4. The method according to claim 1, wherein the averaging step comprises a step of computing averages of said path levels over every averaging period, said averaging period being a time period corresponding to two or more periods of said predetermined processing period.

5. The method according to claim 1, wherein said associating step comprises a step of identifying peaks on different delay profiles as peaks associated with an identical path when positions on a timing axis of the peaks on the different delay profiles coincide with each other or one another within a predetermined timing error.

6. The method according to claim 1, wherein said predetermined processing period is a signal reception period.

7. A CDMA signal reception device, comprising:
a correlation calculation unit adapted to creating a delay profile;
a path-timing calculation unit adapted to selecting a predetermined number of peaks in order starting from highest peak involved in said delay profile and obtaining path timings of the selected peaks, based on said delay profile;
a path-level calculation unit adapted to selecting said predetermined number of peaks in order starting from the highest peak involved in said delay profile and obtaining path levels of the selected peaks, based on said delay profile;
a path-timing comparison unit adapted to comparing the path timings calculated from the delay profiles obtained in a past period with the path timings obtained in a present period, detecting identical paths responsible for different delay profiles and associating respective peaks in each delay profile with paths;
a path-level averaging unit adapted to averaging the path levels obtained by said path level calculation unit on a path-by-path basis over different delay profiles;
a threshold processing unit adapted to applying a threshold to the averaged path levels and selecting paths to be allocated to fingers; and
a finger allocation unit adapted to allocating path timings to said fingers as synchronization signals, said path timings being latest path timings of the path timings that have been obtained for respective selected paths.

8. The device according to claim 7, further comprising a precedingly-calculated average path-level memory adapted to storing averaged path levels calculated in a preceding period, and a precedingly-calculated path-timing memory adapted to storing path timings calculated in the preceding period,
wherein said path-level averaging unit computes averaged path levels in the present period based on the averaged path levels calculated in the preceding period and the path levels in the present period provided from said path level calculation unit, and
said path-timing comparison unit detects, as an identical path, the path that associates with both a path timing calculated in the preceding period and a path timing calculated in the present period by said path timing calculation unit if a difference between both path timings is equal to or smaller than a predetermined value.

9. The device according to claim 7, further comprising a path-level memory adapted to storing path levels during a predetermined number of preceding signal-reception periods, and a path-timing memory adapted to storing path timings during said predetermined number of the preceding signal-reception periods,
wherein said path-level averaging unit computes averages of path levels stored in said path-level memory, and
said path-timing comparison unit decides the identical paths based of the path timings stored in said path-timing memory.

10. The device according to claim 7, further comprising a precedingly-calculated average path-level memory adapted to storing averaged path levels calculated in a preceding period,
wherein said path-level averaging unit calculates averages of said path levels for every averaging period, said averaging period being equivalent to two or more signal-reception periods.

11. A method for receiving a CDMA signal, comprising the steps of:
generating a delay profile;
selecting a predetermined number of peaks in order, starting from highest peak in said delay profile and obtaining path timings of the selected peaks, based on said delay profile;
selecting said predetermined number of peaks in order starting from the highest peak in said delay profile and obtaining path levels of the selected peaks, based on said delay profile;
comparing the path timings calculated from the delay profiles obtained in a past period with the path timings obtained in a present period, detecting identical paths responsible for different delay profiles and associating respective peaks in each delay profile with paths;
averaging the path levels obtained by said path level calculation unit on a path-by-path basis over different delay profiles;
applying a threshold to the averaged path levels and selecting paths to be allocated to fingers; and
allocating path timings to said fingers as synchronization signals, said path timings being latest path timings of the path timings that have been obtained for respective selected paths.

12. The method of claim 11, further comprising the steps of:
storing averaged path levels calculated in a preceding period; and
storing path timings calculated in the preceding period,
wherein the averaged path levels in the present period are computed based on the averaged path levels calculated in the preceding period and the path levels in the present period, and
wherein the path that associates with both a path timing calculated in the preceding period and a path timing calculated in the present period is detected as an identical path if a difference between both path timings is equal to or smaller than a predetermined value.

13. The method of claim 11, further comprising the steps of:
storing path levels during a predetermined number of preceding signal-reception periods; and
storing path timings during said predetermined number of the preceding signal-reception periods,
wherein the detection of the identical paths is based of the stored path timings.

14. The method of claim 11, further comprising the step of:
storing averaged path levels calculated in a preceding period,
wherein averages of said path levels are calculated for every averaging period, said averaging period being equivalent to two or more signal-reception periods.

* * * * *